United States Patent [19]
Bush

[11] 3,835,703
[45] Sept. 17, 1974

[54] FLOW VISUALIZATION USING COLOR REVERSIBLE DYES

[75] Inventor: Clarence C. Bush, Bel Air, Md.

[73] Assignee: The United States of America as represented by the Secretary of the Army, Washington, D.C.

[22] Filed: May 21, 1973

[21] Appl. No.: 362,568

[52] U.S. Cl. .................................... 73/147, 346/1
[51] Int. Cl. ............................................ G01m 9/00
[58] Field of Search........... 73/147, 148; 23/253 TP; 346/1

[56] References Cited
UNITED STATES PATENTS

| | | | |
|---|---|---|---|
| 3,301,046 | 1/1967 | Rubert | 73/147 |
| 3,753,652 | 8/1973 | Gassman | 23/253 TP |
| 3,787,874 | 1/1974 | Urban | 73/147 |
| 3,791,207 | 2/1974 | Jackson | 73/147 |

Primary Examiner—S. Clement Swisher
Attorney, Agent, or Firm—Edward J. Kelly; Herbert Berl

[57] ABSTRACT

A system for surface flow visualization using color reversible dyes comprising an aerodynamic test model positioned in an air tunnel. The model has means for conducting an activating and erasing fluids to the nose of system. The surface of the model has been covered with a paint which has been impregnated with the color reversible dye.

In operation, the tunnel's airstream entrains droplets of an activating fluid which is conducted from a source to the surface of the model. The droplets of entrained fluid impinges on the model thereby affecting a color change which indicates local direction of surface flow. The flow pattern is dried and photographed. Said flow pattern may be subsequently removed by an erasing fluid and a new one formed.

6 Claims, 4 Drawing Figures

FLOW VISUALIZATION USING COLOR REVERSIBLE DYES

The invention described herein may be manufactured, used, and licensed by or for the Government for governmental purposes without the payment to me of any royalty thereon.

BACKGROUND OF THE INVENTION

The purpose of any surface flow visualization is to obtain information about the flow that is intimately associated with the model surface as opposed to the visualization of the flow field which surrounds the model. The surface flow techniques illustrate the flow directions on the model surface, the shock wave roots, separated flow regions, the boundary layer transitions (laminar-to-turbulent), etc. Cross flows and flow stagnations are graphically displayed and heating regions in high speed flows can be inferred. A prior art technique for surface flow visualization normally utilizes a mixture of oil and some kind of solid particulate matter, which silts out and leaves miniature sandbar-like traces on the surface of the aerodynamic vehicle. The mixture utilizes such materials as very fine titanium dioxide powders to display white streaking on models with dark backgrounds, carbon-black on white models, or a fluorescing powder which is excited by ultra violet light at the time of observation and/or photographing. The mixture is generally applied over the surface of the model prior to the test. The oil flow process is suitable for only a single visualization. When the model configuration or the test flow is varied, the tunnel flow must be stopped, new coating applied to the model, and the tunnel flow restarted.

SUMMARY OF THE INVENTION

The present invention is carried out by applying a prime coat painting to the surface of the test model and then covering with anyone of several kinds of white finish coat, e.g., flat or glossy; paint, enamel, lacquer, stencil ink, etc., which has been impregnated with a natural or synthetic colored substance which has the property of either changing color or becoming colorless in a dilute solution when the hydrogen ion concentration is the solution attains a definite and fixed value. Phenolphthalein and thymolphthalein or a mixture thereof were found operable. The activated surface is now found to have a brilliant color reaction when contacted by sufficiently strong alkaline liquids. Ammonia water produces only a temporary color reaction because of its evaporative nature. A more brilliant and lasting display is produced by a solution of sodium hydroxide in water and/or water miscible oil. More lasting color reactions result when the activated paint surface is porous; but at the expense of a shortened active lifetime for the impregnated paint layer. The alkaline activating fluid can simply be carried in mist or droplet form in an air stream or it can be routed through a passageway in the model to its forward extremity where it is permitted to flow back and over the model. In the latter approach, the model must be able to withstand chemical attack, particularly at the emitting orifices.

The present technique is an improvement over the ordinary oil flow technique where models are laboriously prepared with a delicate pattern of oil dots before each flow test. In the case of the point source of color with the reversible dye technique, the model need be prepared only once. Also there are no problems relating to gravity distortion of dots due to the lapse of time prior to commencement of the air flow in an air tunnel.

It is an object of the present invention to provide and disclose a system for surface flow visualization of an aerodynamic model in an air tunnel.

It is a further object of the present invention to provide and disclose a system for surface flow visualization of an aerodynamic model in an air tunnel which permits pattern erasures and reformations without the requirements for stopping the flow of air in the wind tunnel.

Other objects and a fuller understanding of the invention may be had by referring to the following description and claims taken in conjunction with the accompanying drawing in which:

DESCRIPTION OF THE PREFERRED EMBODIMENT

Figure 2:
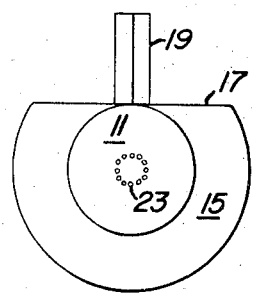
FIG. 2 is a schematic illustration of the front view of the model of FIG. 1.
Figure 1:
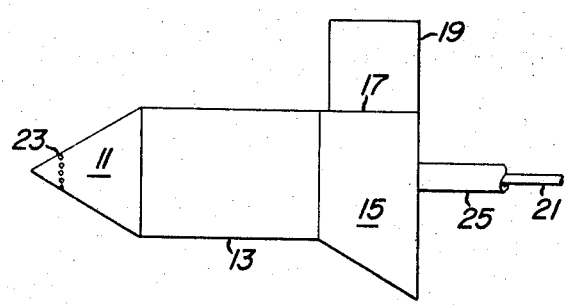
FIG. 1 is a schematic illustration of the side view of an aerodynamic model.
Figure 3:
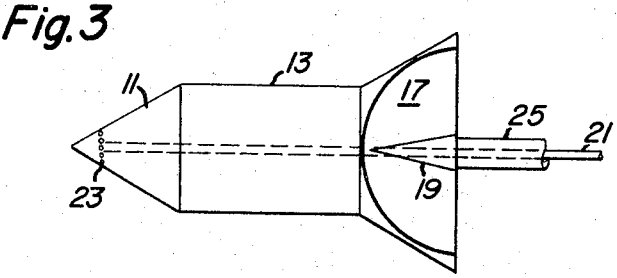
FIG. 3 is a schematic illustration of a top view of the model of FIG. 1.

Referring now to FIG. 1 of the drawing, the aerodynamic model utilized to carry out the present method comprises a housing having a cone-shaped front section 11, cylindrical body section 13 and partially flared tail section 15. In addition, the tail section comprises a flat segment 17 to which is attached wedge-shaped upright segment 19. Conduit means 21 comprises a pipe extending axially through the interior of the model, and is operably connected with fluid emission holes 23 extending from the interior to surface front section 11 of the model. Conduit means 21 are supported in turn by stud 25.

Figure 4:
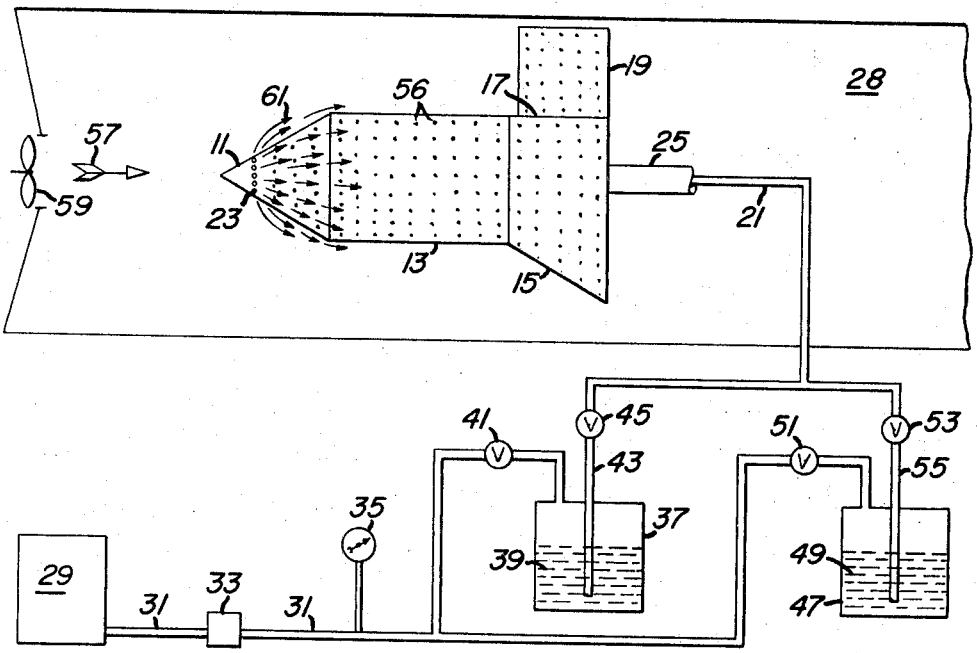
FIG. 4 is a schematic illustration of the present system comprising an aerodynamic model, having a discrete pattern of color indicator impregnated in the surface of the model, positioned in a wind tunnel.

A schematic illustration of the fluid system in combination with the aerodynamic model, which is positioned in air tunnel 28, is shown in FIG. 4 of the drawing. The system comprises any conventional source of pressure designated 29, operably connected by air conduit means 31 to pressure regulator means 33 and pressure gage 35. Reservoir 37 containing activating solution 39 is operably connected to air conduit means 31. The air flow into reservoir 37 is regulated by valve 41. The activating solution is transmitted into wind tunnel 28 through fluid emission holes 23 to the surface of the aerodynamic model by activating solution conduit means 43. The flow of activating solution is controlled by valve 45 positioned on conduit means 43. An identical arrangement is utilized in regards to reservoir 47 which contains the erasing solution 49. Valve 51 regulates flow of air pressure, and valve 53 positioned on erasing solution conduit means 55 regulate the flow of erasing solution 49 through fluid emission holes 23 to the surface of the aerodynamic model.

The model should be constructed of any material which is resistant to both alkaline activators and the weak acid rinse. The model should also be composed of a suitable base material for the paint coatings. Stainless steel or a plastic, e.g., Lexan, Ethocell and Lucite, meets the above requirements.

The model may be primed with various paints including any of several zinc chromate or red oxide primers to provide a suitable base for the activated white coat. In the present case, a base coat of aerosol sprayed DeRusto No. 511 Whitest White was applied to a Lexan model. After the prime coat had dried, a second coat of DeRusto No. 511 Whitest White was applied to the prime coat. Powdered phenolphthalein is then sifted onto the model when the final coat has just begun to dry. The amount of phenolphthalein utilized is not critical. The phenolphthalein powder may be applied as a uniform coating completely over the model or at certain discrete points designated 56 as shown in FIG. 4. When the final coat is completely dry, the model is finely sanded to a smooth surface to expose the color producing powder which was encapsulated by the paint.

The concentration of the alkaline solution or activating solution is maintained no stronger than necessary. It may, for example, be increased as the color reacting capability of the model coating begins to decrease. In the present example, an alkaline solution was prepared utilizing 1 pellet of commercially available sodium hydroxide (3/16 inches diameter) to 10 mls of liquid consisting of Houghto-Safe No. 620 (a water miscible oil) and 50 percent water. A sodium hydroxide solution having a pH of at least 9 is operable in combination with phenolphthalein. A glacial acetic acid solution having a pH of 6 has been found operable in the erasures of the color patterns formed by the contacting of discrete patterns of phenolphthalein with the sodium hydroxide.

The system is activated by the application of air pressure to reservoir 37 which results in spray of alkaline solution entering the main airflow ahead of the model as shown in FIG. 4, wherein the supersonic airstream 57, generated by fan 59 carries some of the small droplets, designated 61, back to the model surface to produce the streaking which defines the local flow directions paths, etc. on the model surface. A differential pressure of about 2 or 3 psi produces a flow of the activator fluid out of the emission holes wherein the activator fluid flows back over the model surface to produce the desired surface flow pattern. When the flow of activator liquid is stopped, the surface is quickly dried by the air stream and the retained patterns are photographed using standard front lighting techniques.

A subsequent rinse with pattern erasing fluid 49 through the same passageways in the model removes the patterns as it flows back over the model surface. The configuration of the model may then be adjusted by remote control (not shown), e.g., pitch, roll or yaw, and the model is ready for another and completely new flow pattern formation. Also, for example, the tunnel pressure or Mach number can be adjusted (not shown) while the tunnel air flow is in progress to provide to that type of change to the test conditions.

Although I have described my invention with a certain degree of particularity, it is understood that the present disclosure has been made by way of example and numerous changes will occur to a person skilled in the art without departing from the spirit and the scope of the invention as hereinafter claimed.

Having described my invention, I claim:

1. A coated aerodynamic model for surface flow visualization comprising a housing having a cone-shaped front section, fluid emission holes extending from the front of the interior of said front section to the exterior surface thereof, fluid conducting means extending axially through the model and connecting with the fluid emission holes, the final coating of the surface of the model comprising a paint having a color indicator encapsulated therein; whereupon the contacting of the surface of the model with an activating solution in a wind tunnel under operation conditions, a color change takes place illustrating the surface air flow.

2. A system for surface flow visualization comprising a coated aerodynamic model positioned in a wind tunnel, said model comprising a housing having a cone-shaped front section, fluid emission holes extending from the front of the interior of said front section to the exterior surface thereof, fluid conducting means extending axially through the model and connecting with the fluid emission holes, the final coating of the surface of the model comprising a paint having a color indicator encapsulated therein, means for conducting an activating solution to the exterior of the front section, means for conducting an erasing liquid to the exterior of the front section; wherein the operation of the system a flow of activator fluid out of the emission holes produces the desired surface flow patterns which can be subsequently removed by the contacting thereof with an erasing fluid.

3. A system in accordance with claim 1 wherein the activating solution is a sodium hydroxide solution.

4. A system in accordance with claim 2 wherein the erasing liquid is glacial acetic acid.

5. A system in accordance with claim 2 wherein the activating solution is a sodium hydroxide solution.

6. A system in accordance with claim 2 wherein the activating solution is a sodium hydroxide solution, and wherein the erasing liquid is glacial acetic acid.

* * * * *